UNITED STATES PATENT OFFICE.

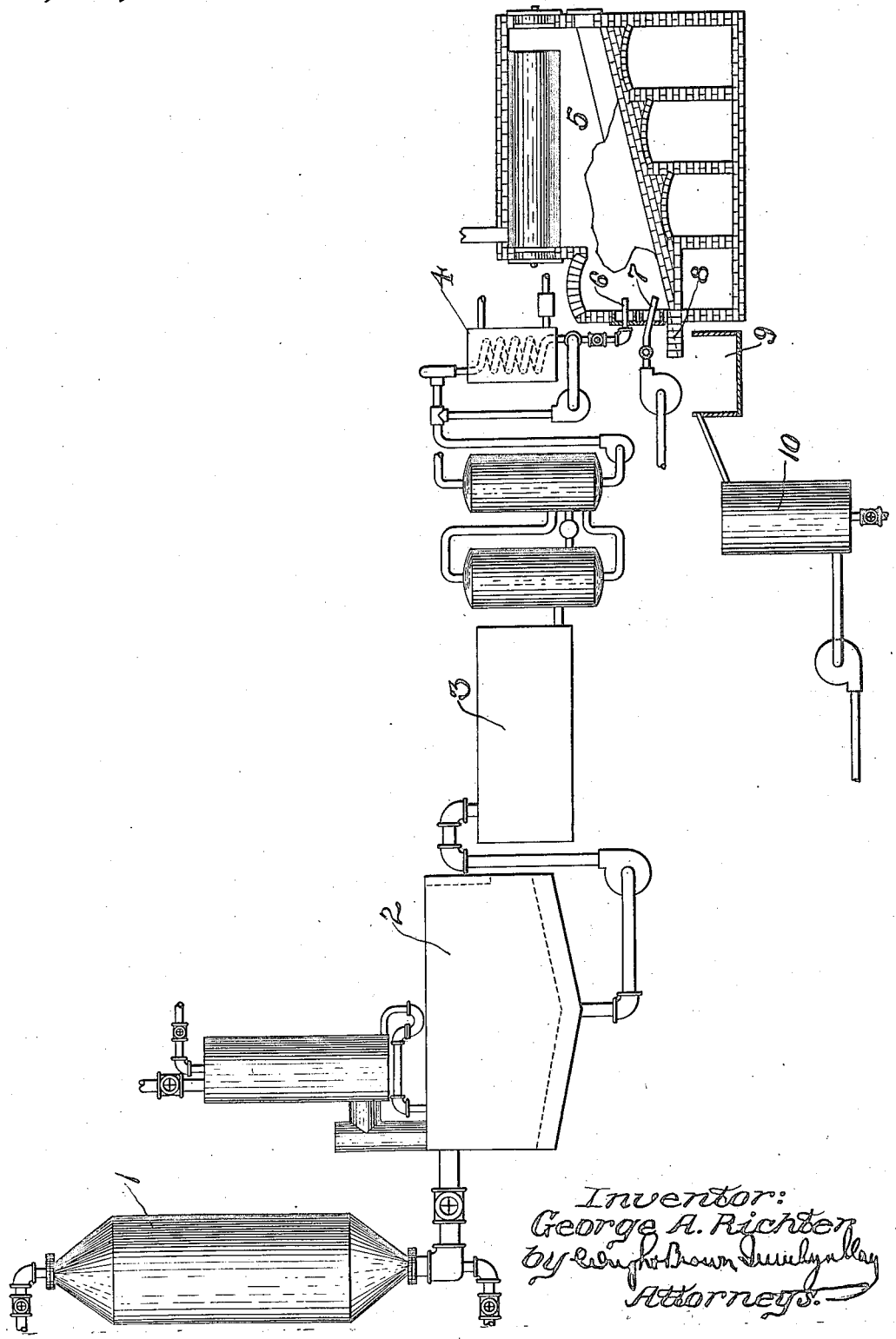

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF FIBER LIBERATION.

1,427,125.  Specification of Letters Patent.  Patented Aug. 29, 1922.

Application filed February 21, 1921. Serial No. 446,574.

*To all whom it may concern:*

Be it known that I, GEORGE A. RICHTER, a citizen of the United States, residing at Berlin, in the county of Coos and State of New Hampshire, have invented new and useful Improvements in Processes of Fiber Liberation, of which the following is a specification.

This invention has relation to the digestion of wood for the production of cellulose fiber; such as employed in the manufacture of news print, writing paper or the like.

In the manufacture of chemical wood pulp, so-called, three processes have largely been used, denominated more or less aptly by the terms "sulphite," "sulphate" and "soda" processes. In the sulphite process, the cooking liquor consists of calcium or magnesium bisulphite with more or less free sulphurous acid. In the sulphate process, so-called, the cooking liquor consists essentially of a solution of sodium sulphide and sodium hydroxide. In the soda process, so-called, the cooking liquor consists essentially of sodium hydroxide solution.

The present invention has relation more particularly to what is known as the sulphite process, although, in producing the cooking liquor, I employ as a base or raw material a sulphate which is soluble in water.

It is not known precisely what function is performed by the sulphite in the cooking liquor. It is ordinarily assumed that the free sulphurous acid present in the solution hydrolyzes the wood. During hydrolysis, a free organic acid is formed, which, if undisturbed, will cause further decomposition of the cellulose produced. The apparent function of the base in solution is to react with this free organic acid, thereby removing it from the field of action. Where the wood is subjected only to the action of sulphuric or sulphurous acids, the action is so violent as to char or injure the cellulose, and yet a certain amount of sulphurous acid is necessary in the cooking liquor for the hydrolyzing action referred to. When a cooking liquor is employed, which consists of a base such as calcium or magnesium and free sulphurous acid, the recovery of the constituents from the waste liquor is a serious problem and is costly to carry out. As a result, it is the custom commercially to discharge the waste liquors into streams, thereby polluting the water. Various attempts have been made to utilize the waste liquor resulting from the sulphite process and to some extent the waste sulphite liquor is utilized, but, in actual practice, it is no exaggeration to say that practically all of the waste sulphite liquor is discharged into running water such as the rivers and streams, which are injured thereby.

My present invention has for its object to produce a new method of digesting wood for the liberation of cellulose fibers, by which I am able to produce a finer fiber, and one which is capable of being easily bleached, and easily hydrated in the subsequent paper manufacture, and by which it is possible to recover the valuable constituents of the waste liquor and thus prevent the further pollution of rivers and streams. This object is accomplished by employing in the production of the liquor a soluble sulphate, preferably a sulphate of the alkaline or alkaline earth groups. For example, I may employ the sulphates of sodium, magnesium, potassium, zinc, lithium, etc. An aqueous solution of such a sulphate, however, is of itself of little value in the digestion of wood, and therefore it is necessary to dissolve the sulphate in a sulphurous acid solution.

In actual practice, the cooking liquor may be produced by the following procedure. Sodium sulphate, for example, may be dissolved in water to produce a solution of say 3% to 5%. Through this solution is now bubbled $SO_2$, until the resulting acid solution contains free sulphurous acid from 2% to 7%. I prefer to employ a solution containing say 4% sodium sulphate and 5% sulphur dioxide. The reaction taking place in the aqueous solution may be expressed substantially by the reversible equation as follows:

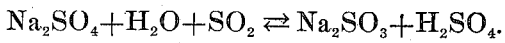

$$Na_2SO_4 + H_2O + SO_2 \rightleftarrows Na_2SO_3 + H_2SO_4.$$

In view of the fact that sulphuric acid is a much stronger acid than sulphurous acid, this reversible reaction results in a concentration of chemicals favorable to those represented on the left-hand side of the above equation. It is fair to assume that, as the cooking progresses, the lesser concentration of sodium sulphite is used in neutralizing free organic acids formed, thereby displacing the equilibrium in such way as to form more sodium sulphite, which in turn is able to react with more free organic acid formed. This progressive decomposition continues until the cooking operation is complete. In this way, it is seen that the sodium sulphate present in solution acts more or less as an available source of sodium which may be transformed into an active constituent represented by sodium sulphite. Experience has demonstrated that the concentration of sulphuric acid, resulting from this progressive supply of sodium sulphite, is not sufficient to injure the cellulose fiber resulting from the cooking process.

In actual practice, the same procedures may be followed as in the cooking of the wood in a calcium bisulphite solution; that is to say, I use the same type of digester as used in that process, and supply the chips and the cooking liquor thereto, and otherwise follow out the same procedure as is generally followed, relieving the digester from time to time as may be needed. Steam is injected as ordinarily to cause an ebullition of the mass in the digester, and to raise the pressure and the temperature to the desired points.

When the digester is blown, the $SO_2$ may be recovered from the cooking liquor by known approved processes. Instead of discharging the waste liquor from the blow pit into adjacent streams, the following procedure is employed. The waste liquor is collected in a suitable tank and is neutralized with sodium carbonate, and then, by the process described in the Moore and Quinn Patent No. 1,326,414, the liquor may be more or less evaporated and concentrated and then burned in a combined smelting and boiler furnace for the recovery of the sulphate. Instead, however, of employing a furnace in which a reducing atmosphere is maintained adjacent the molten mineral constituent, the furnace is so arranged as to supply an oxidizing atmosphere, so that the sulphate is recovered in the same form in which it was previously used, and is thus ready to be used again in the manufacture of the cooking liquor.

On the drawing, I have shown more or less conventionally and diagrammatically an apparatus such as may be employed in carrying out my process of recovering the soluble sulphate in the waste liquor. In this case, the digester is indicated at 1 and the blow pit at 2. 3 indicates a storage tank for the reception of the waste liquor resulting from the digestion of the wood. In this tank the waste liquor is neutralized with sodium carbonate, and is pumped to a circulating system indicated as a whole at 4. 5 indicates a combined smelting and boiler furnace having nozzles 6 leading from the circulating system. The liquor in the circulating system is heated to a high temperature but is also maintained under a pressure greater than the vapor pressure so that an explosive force is generated in the liquor. As the liquor is discharged from the nozzles 6, it is disrupted by the explosive force generated therein, and the combustible constituents thereof are consumed in the combustion chamber of the furnace. The molten mineral mass (which includes sodium sulphate and sodium carbonate) collects in the bottom of the furnace. An oxidizing atmosphere is maintained in the lower part of the furnace by air pipes 7 which lead through the front wall thereof as indicated conventionally.

The molten effluent, discharged by spouts 8, is received in a dissolving tank 9 and may then be passed to the mixing tank 10 in which the sulphur dioxide is passed through the aqueous solution. Such sodium carbonate as may be present in the solution reacts with the sulphur dioxide for the production of sodium sulphite. Such adventitious sodium sulphite as may be present in the resultant cooking liquor does not accumulate with the continued use of the starting material, inasmuch as the losses which are suffered in the process are made up by the addition of the salt cake or sodium sulphate.

Among the advantages incident to the process of fiber liberation herein described may be noted the following. First, it is possible to produce a cooking liquor by passing the sulphur dioxide through a clear solution rather than through a milky suspension, thereby eliminating the troubles encountered in handling such suspensions. Again, in previous processes in which the calcium bisulphite cooking liquor is employed, great trouble is experienced in producing the liquor because of the formation of sulphur trioxide in the burner gases, which produce insoluble sulphates. These insoluble sulphates tend to coat the fibers and to deposit throughout the system. My process avoids these troubles.

By my process, I find that I am able to produce a pulp of better color, having easier beating properties and greater strength than the average unbleached pulp by the calcium bisulphite process. I further find that in bleaching the pulp, I am able to use a smaller amount of bleach than has heretofore been possible in the practical manufacture of bleached sulphite pulp.

In addition to the foregoing, one of the great advantages of the process is that I am able to recover with ease the sulphate from the waste liquor. This results not only in a very material saving in the cost of raw material, but also avoids the necessity of dumping the waste liquors into flowing streams.

What I claim is:—

1. The process of digesting cellulosic material for the production of cellulose fiber, which comprises cooking the raw material in a sulphurous acid solution of a soluble sulphate.

2. The process of digesting cellulosic material for the production of cellulose fiber, which comprises cooking the raw material in a sulphurous acid solution of sodium sulphate.

3. The herein described process of digesting cellulosing material, which comprises dissolving a soluble sulphate and sulphur dioxide in water, and cooking the cellulosic raw material in the resultant solution under conditions of heat and pressure.

4. The herein described step in the process of liberating fiber, which consists in dissolving a sulphate in water, and absorbing sulphur dioxide therein.

5. The herein described step in the process of liberating fiber, which consists in dissolving a sulphate in water, and absorbing sulphur dioxide therein in such proportions as to produce a solution containing approximately definite percentages of sulphate and sulphur dioxide.

6. The herein described process which comprises digesting raw cellulosic material in a sulphurous acid solution of a soluble sulphate, removing the waste liquor from the resultant pulp, and recovering the sulphate from the waste liquor.

7. The herein described process which comprises digesting raw cellulosic material in a sulphurous acid solution of a soluble sulphate, removing the waste liquor from the resultant pulp, concentrating the waste liquor by evaporation, burning the combustible content of the evaporated liquor, smelting the inorganic content thereof in an oxidizing atmosphere, and recovering the soluble sulphate.

8. The herein described process which comprises digesting raw cellulosic material in a sulphurous acid solution of a soluble sulphate, removing the waste liquor from the resultant pulp, neutralizing the acid therein, concentrating the waste liquor by evaporation, burning the combustible content and smelting the inorganic content thereof, and recovering such inorganic content.

In testimony whereof I have affixed my signature.

GEORGE A. RICHTER.